(12) United States Patent
Birchak et al.

(10) Patent No.: US 10,913,538 B2
(45) Date of Patent: Feb. 9, 2021

(54) OUTFLOW VALVE ASSEMBLIES INCLUDING NON-METALLIC FRAMES AND ENHANCED ATTACHMENT FEATURES

(71) Applicant: HONEYWELL INTERNATIONAL INC., Morris Plains, NJ (US)

(72) Inventors: Daniel C. Birchak, Gilbert, AZ (US); Albert Kang, Chandler, AZ (US); Darrell Horner, Oro Valley, AZ (US); John Perek, Phoenix, AZ (US); Abhay Naik, Karnataka (IN); Jagadeesh Hariwal, Karnataka (IN); William F. Ryan, Phoenix, AZ (US); Doug Smith, Phoenix, AZ (US); Bharath Chandra G, Andhra Pradesh (IN); Saravana Mahalingam, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 86 days.

(21) Appl. No.: 16/268,559

(22) Filed: Feb. 6, 2019

(65) Prior Publication Data
US 2020/0247549 A1    Aug. 6, 2020

(51) Int. Cl.
*B64D 13/02* (2006.01)
*B64D 13/00* (2006.01)

(52) U.S. Cl.
CPC ............. *B64D 13/02* (2013.01); *B64D 13/00* (2013.01); *B64D 2013/003* (2013.01); *Y10T 137/6906* (2015.04)

(58) Field of Classification Search
CPC .. B64D 13/02; B64D 13/04; B64D 2013/003; Y10T 137/6906
See application file for complete search history.

(56) References Cited

U.S. PATENT DOCUMENTS 5,765,592 A * 6/1998 Karlicek ................. F16K 1/165
                                                         137/601.06
6,446,935 B1    9/2002 Winkler
(Continued)

FOREIGN PATENT DOCUMENTS

EP    2973869 A1    1/2016
EP    3147214 A1    3/2017
(Continued)

*Primary Examiner* — Kevin F Murphy
(74) *Attorney, Agent, or Firm* — Lorenz & Kopf, LLP

(57) ABSTRACT

Outflow valve (OFV) assemblies including non-metallic frames and enhanced attachment features are provided. In embodiments, the OFV assembly includes a non-metallic frame to which at least one valve door is pivotally mounted. The non-metallic frame may, in turn, include a generally rectangular frame body, a central opening through the frame body, an outer peripheral flange extending around at least a portion of the frame body. Frame attachment interfaces are distributed or spaced around the outer peripheral flange of the non-metallic frame. The frame attachment interfaces include fastener openings and elevated platform regions, which project from an inboard side of the outer peripheral flange and through which the fastener openings extend. Base plates seat against the elevated platform regions. Fasteners engage the base plates and extend through the fastener openings to an outboard side of the outer peripheral flange to attach the OFV assembly to an aircraft fuselage.

18 Claims, 11 Drawing Sheets

(56) References Cited

U.S. PATENT DOCUMENTS

| | | | |
|---|---|---|---|
| 7,744,061 B2 * | 6/2010 | Isogai | F02D 9/101 |
| | | | 251/208 |
| 8,632,381 B2 | 1/2014 | Horner et al. | |
| 8,783,285 B2 * | 7/2014 | Kulesha | F16K 31/002 |
| | | | 137/522 |
| 2013/0186497 A1 | 7/2013 | Royalty et al. | |
| 2014/0134936 A1 | 5/2014 | Horner et al. | |
| 2017/0217604 A1 | 8/2017 | Birchak et al. | |
| 2017/0225793 A1 | 8/2017 | Schmdt et al. | |

FOREIGN PATENT DOCUMENTS

| | | |
|---|---|---|
| EP | 3170750 A1 | 5/2017 |
| EP | 3599173 A1 | 1/2020 |

* cited by examiner

OUTFLOW VALVE ASSEMBLIES INCLUDING NON-METALLIC FRAMES AND ENHANCED ATTACHMENT FEATURES

TECHNICAL FIELD

The following disclosure relates generally to airborne valves utilized onboard aircraft and, more particularly, to outflow valve assemblies including non-metallic (e.g., molded composite) frames and enhanced attachment features.

ABBREVIATIONS

Abbreviations appearing relatively infrequently in this document are defined upon initial usage, while abbreviations appearing more frequently in this document are defined below.
A/C—aircraft;
OFV—outflow valve; and
PEEK—polyether ether ketone

BACKGROUND

Cabin outflow valve (OFV) assemblies are commonly installed in the underbelly of an A/C fuselage to regulate cabin pressure during flight and, in certain instances, to provide thrust recovery when venting pressurized airflow to the ambient environment. By common design, a cabin OFV assembly includes a frame having a rectangular form factor and a central opening therethrough. One or more valve doors are positioned over the central opening and pivotally mounted to the OFV frame. The valve doors are movable between fully open, closed, and intermediate positions by a valve actuator, which is further mounted to a platform or "support tower" region of the OFV frame. During flight, the valve actuator rotates the valve doors in unison between a range of positions to control pressurized airflow from the A/C fuselage to the ambient environment. In certain cases, movement of the doors may be synchronized with different phases of flight. For example, during the cruise phase of flight, the actuator may rotate the valve doors to an intermediate position to discharge a controlled amount of pressurized airflow to the ambient environment for cabin pressure regulation and thrust recovery.

Traditionally, the frame of an OFV assembly is fabricated from a lightweight, high strength alloy, such as an aluminum or titanium-based alloy. More recently, certain efforts have focused on redesigning the OFV frame for fabrication from non-metallic materials, such as engineered thermoplastics, for added weight reduction, cost savings, and ease of manufacture. Various technical challenges are encountered when attempting to redesign an OFV frame for fabrication from lightweight, non-metallic materials, however. For example, it has proven exceedingly difficult to fabricate an OFV frame from a molded thermoplastic material, while retaining the ability of the frame to appropriately interface with mating components composed of disparate materials, including metallic mounting hardware. Reductions in the longevity and reliability of frame attachment interfaces are seen due, at least in part, to an inability to maintain fastener preloads as the thermoplastic (or other non-metallic) frame material creeps, reflows, or otherwise deforms with thermal cycling over time. Further, material over-stress, fatigue, and damage can occur when securing a non-metallic frame to the A/C fuselage and when attaching other masses, such as the valve actuator, to the OFV frame. Still further complicating such issues, the OFV frame is generally required to possess sufficient flexibility to accommodate significant fuselage deflection, while further withstanding exposure to ambient contaminants and thermal extremes encountered during A/C flight.

There thus exists an ongoing demand within the aerospace industry for the provision of OFV assemblies, including cabin OFV assemblies, containing non-metallic frames capable of overcoming many, if not all of the aforementioned limitations. Ideally, such non-metallic OFV frames would be amenable to production from high strength, lightweight materials, such as moldable thermoplastic composites, to achieve weight and cost savings. Further, such non-metallic OFV frames are desirably capable of accommodating significant fuselage deflection, while providing highly robust and durable attachment interfaces with metallic mounting hardware and other components physically interconnected to the OFV frame when installed on an A/C. Other desirable features and characteristics of embodiments of the present invention will become apparent from the subsequent Detailed Description and the appended Claims, taken in conjunction with the accompanying drawings and the foregoing Background.

BRIEF SUMMARY

OFV assemblies, such as cabin OFV assemblies utilized onboard A/C, including non-metallic frames and enhanced attachment features, mechanisms, or interfaces are provided. In embodiments, the OFV assembly includes a non-metallic frame to which at least one valve door is pivotally mounted. The non-metallic frame can be composed of, for example, PEEK or another thermoplastic material loaded with a filler, such as carbon fibers, to yield a high strength composite. The non-metallic frame includes, in turn, a generally rectangular frame body, a central opening through the frame body, an outer peripheral flange extending around at least a portion of the frame body. Frame attachment interfaces are distributed or spaced around the outer peripheral flange of the non-metallic frame. The frame attachment interfaces include fastener openings and elevated platform regions, which project from an inboard side of the outer peripheral flange and through which the fastener openings extend. Mounting hardware is utilized to secure the OFV assembly to an A/C fuselage. The mounting hardware can include nut or base plates, which seat against or abut the elevated platform regions; and a plurality of fasteners, which engage the base plates and extend through the fastener openings to an outboard side of the outer peripheral flange to attach the OFV assembly to the A/C fuselage.

In further implementations, the OFV assembly contains an OFV frame and at least one valve door, which is pivotally mounted to the OFV frame. The OFV frame includes a generally rectangular frame body through which a central opening is provided. An outer peripheral flange extends around an outer perimeter of the frame body, and fastener openings are formed at selected locations through the outer peripheral flange. Recesses or depressions are formed in an outboard side of the outer peripheral flange. Raised features, such as raised rims, are further formed in the outer peripheral flange, located within the recesses, and circumscribe or extend around the first plurality of fastener openings. Further, in certain instances, the frame body, the outer peripheral flange, and the raised rims are molded or otherwise integrally formed as a single piece from a non-metallic material, such as a carbon fiber-loaded PEEK or another thermoplastic material. In some embodiments, elevated platform regions are further provided on an inboard side of the outer peripheral flange at locations opposite the raised rims, as taken along axes parallel to the centerline of the OFV frame.

Non-metallic OFV frames having enhanced attachment features are further disclosed. In various implementations, the non-metallic OFV frame includes a frame body surrounding a central opening, an outer peripheral flange extending around at least a portion of the frame body, and frame attachment interfaces formed in the outer peripheral flange. The frame attachment interfaces contain platform regions projecting from inboard side of the outer peripheral flange, as well as a first plurality of fastener openings formed through the platform regions. In certain instances, the platform regions have elongated (e.g., substantially ovular) planform geometries; and, perhaps, are oriented such that a maximum dimension (e.g., a major diameter) of each platform region extends substantially parallel to an adjacent segment of an inner peripheral wall of the OFV frame. Additionally or alternatively, the plurality of frame attachment interfaces may include recesses formed in an outboard side of the outer peripheral flange, as well as raised rims within the recesses and circumscribing the first plurality of fastener openings. Finally, in at least some implementations, the outer peripheral flange, the frame body, and the platform regions are integrally formed as a single (e.g., molded) piece or monolithic part.

Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

Figure 1:
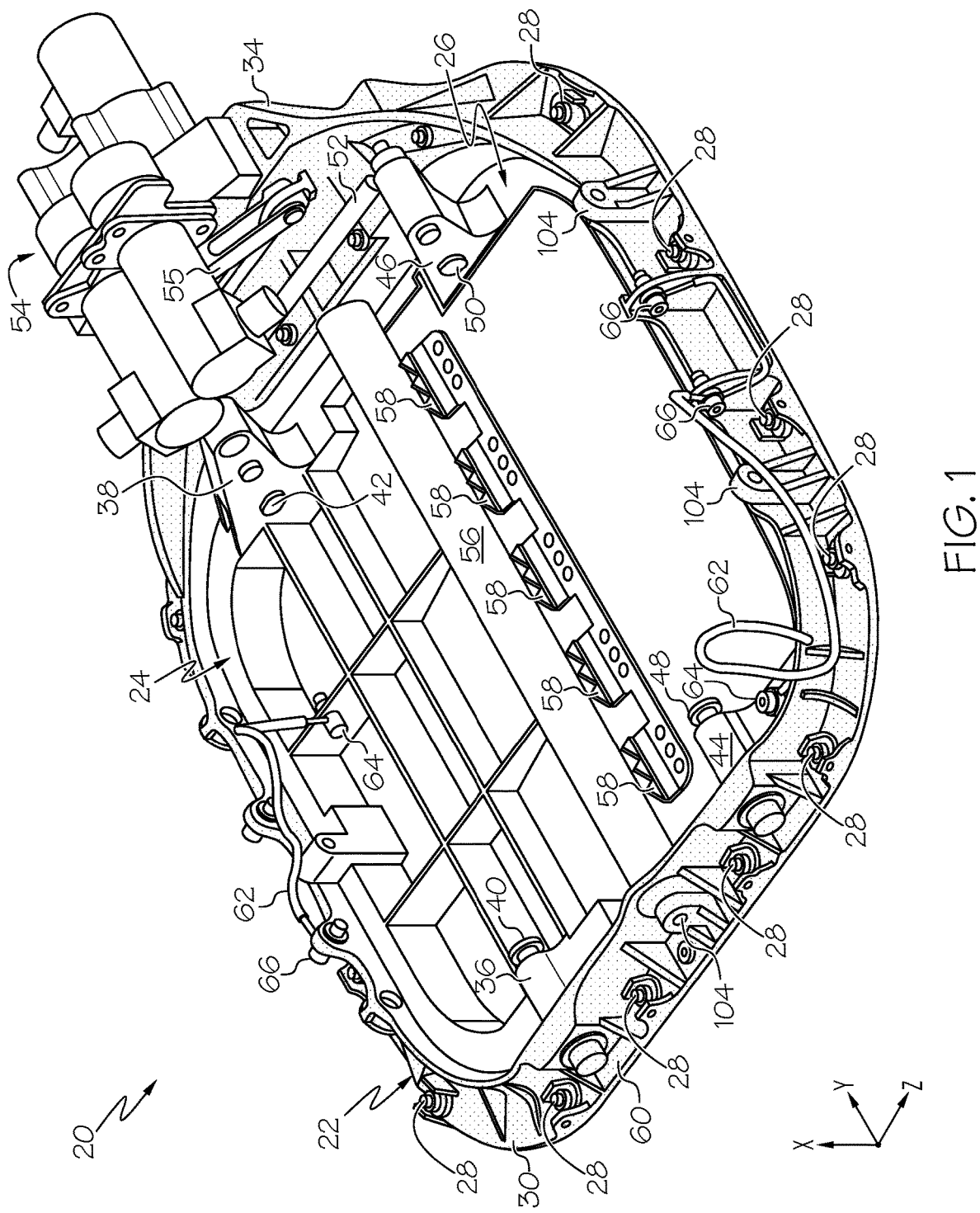
FIGS. 1 and 2 are isometric views of a cabin OFV assembly including a valve actuator, a cage (shown exclusively in FIG. 2), and a non-metallic OFV frame having enhanced attachment features, as illustrated in accordance with an exemplary embodiment of the present disclosure.

For simplicity and clarity of illustration, descriptions and details of well-known features and techniques may be omitted to avoid unnecessarily obscuring the exemplary and non-limiting embodiments of the invention described in the subsequent Detailed Description. It should further be understood that features or elements appearing in the accompanying figures are not necessarily drawn to scale unless otherwise stated.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

Overview

The following describes OFV assemblies, such as cabin OFV assemblies deployed onboard A/C, including non-metallic frames and enhanced attachment features, mechanisms, or interfaces. In various embodiments, the enhanced attachment features secure the non-metallic OFV frame to an A/C fuselage, while maintaining joint integrity over prolonged periods of time through in-flight deflections of the A/C fuselage, exposure to thermal cycling, and other operating conditions. Certain enhanced attachment features may include resilient members and leverage mechanism, which can be provided as molded features of the non-metallic (e.g., thermoplastic composite) OFV frame or otherwise integrated into the OFV frame, to boost tolerance of higher fastener preloads and dynamic loading conditions (as occurring during fuselage deflection) without over-stressing, fatiguing, and potentially cracking or otherwise damaging the non-metallic frame material.

Due to the inclusion of such features or interfaces, higher fastener preload may be maintained over extended periods of time and despite any gradual deformation (e.g., thermal creep) of the non-metallic OFV material. Fastener preloads may also be better tolerated and maintained through the selective usage of metallic insert, sleeve, or lugs in certain regions of the OFV frame, while compression limiters may be utilized to prevent excessive localized stress concentrations when mounting larger masses, such as the valve actuator, to the OFV frame. The below-described enhanced attachment features may thus be utilized to not only mount the non-metallic OFV frame to an A/C fuselage, but further to attach various other components (e.g., the valve actuator and, perhaps, a cage) to the OFV frame itself. Embodiments of the OFV assembly may also include other unique features or enhanced attachment interfaces, such as so-called "loose fit" bearing interfaces enabling bearing installation within cavities of the OFV frame without imparting excessive stress to the surrounding frame material.

Through the strategic incorporation of enhanced attachment features of the type described herein, an OFV assembly including a non-metallic OFV frame can be produced that overcomes many, if not all, of the limitations set-forth in the foregoing section entitled "BACKGROUND." As a result, substantial cost and weight savings may be realized through the production of OFV valve assemblies containing non-metallic OFV frames without detriment to the reliability, longevity, and other performance aspects of the OFV valve assembly. Further, manufacturing requirements may be eased by enabling the OFV frame to be fabricated as a single or monolithic piece composed of a non-metallic material, such as a carbon fiber-loaded PEEK or another thermoplastic composite, whether the OFV frame is produced via molding, via additive manufacture (e.g., utilizing three dimensional printing) process, or utilizing another manufacturing technique. Further description of an exemplary (e.g., cabin) OFV assembly containing such a non-metallic OFV frame will now be set-forth in conjunction with FIGS. 1-11.

Figure 2:
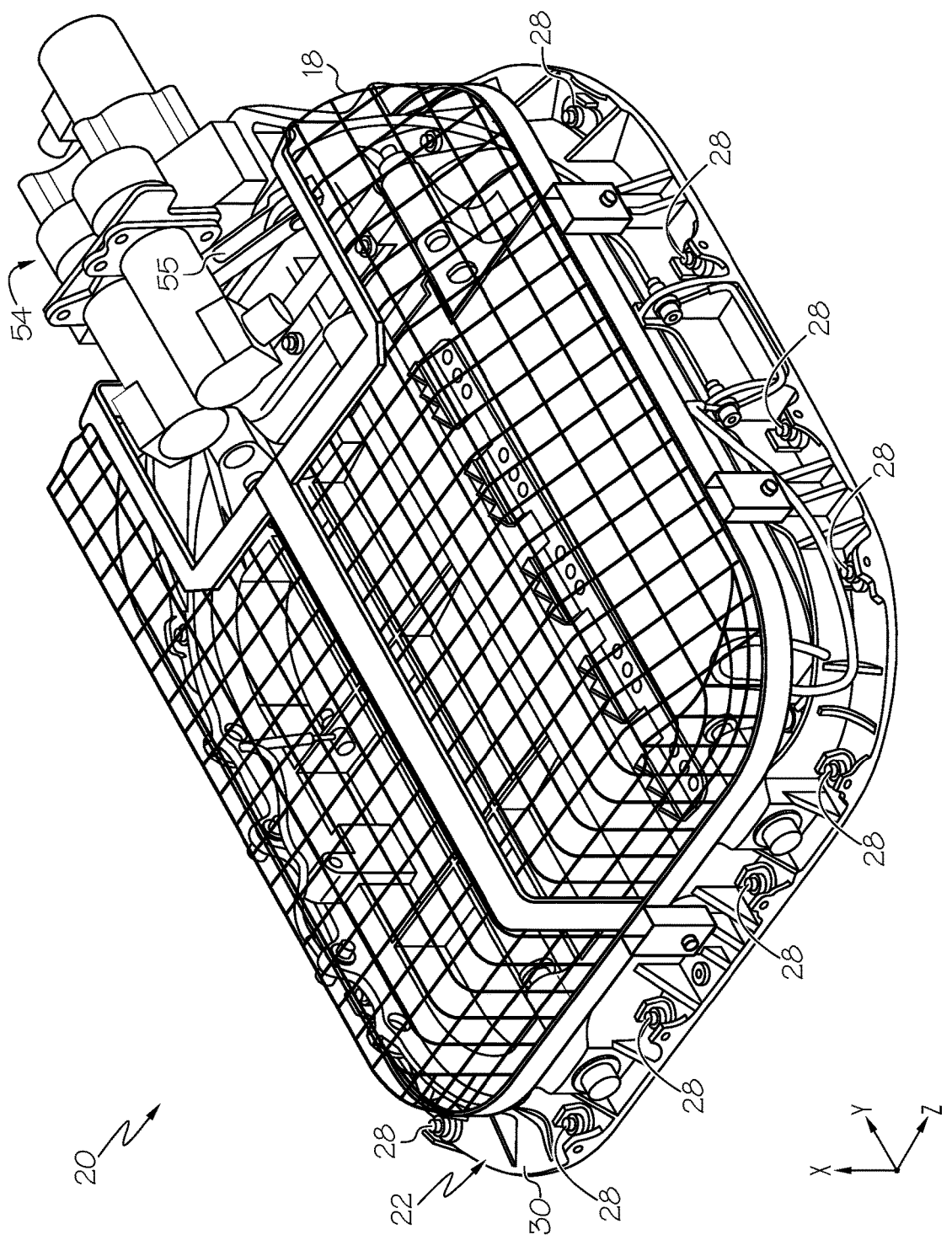

Exemplary Embodiment of an Outflow Valve Assembly Including a Non-Metallic Frame and Enhanced Attachment Features With initial reference to FIGS. 1 and 2, a cabin OFV assembly 20 is illustrated in accordance with an exemplary embodiment of the present disclosure. Cabin OFV assembly 20 includes a non-metallic OFV frame 22, which is mounted over an opening in the fuselage when OFV assembly 20 is installed on an A/C. Mounting hardware 28 engages a mount interface of OFV frame 22 (here, a peripheral flange 30 having fastener openings therein) to attach OFV frame 22 to the non-illustrated A/C fuselage. Mounting hardware 28 thus forms part of the enhanced frame attachment features discussed more fully below in connection with FIGS. 3-5. Two valve elements or doors 24, 26 are pivotally mounted to OFV frame 22 and assume the form of butterfly plates having generally rectangular form factors. During operation of cabin OFV assembly 20, valve doors 24, 26 are rotated or otherwise moved through a range of positions relative to OFV frame 22 to regulate pressurized airflow through OFV assembly 20. In other embodiments, valve doors 24, 26 may assume other forms and/or OFV assembly 20 may instead include a different number of valve doors. In certain instances, and as shown exclusively in FIG. 2, a cage 18 may be attached to cabin OFV assembly 20 and, specifically, to OFV frame 22 to enclose valve doors 24, 26. Certain enhanced attachment features may be utilized to secure cage 18 to OFV frame 22, as discussed below in connection with FIG. 6. Cage 18 is, however, generally unnecessary from a functional standpoint and may be omitted in further embodiments of OFV assembly 20.

Valve doors 24, 26 are pivotally mounted to different portions of OFV frame 22. Various attachment interfaces may be employed, while permitting the desired pivoting motion of valve doors 24, 26 relative to OFV frame 22. In this regard, and as shown most clearly in FIG. 1, valve door 24 includes first and second arms 36, 38, which are rotationally joined to OFV frame 22 at pivot couplings 40, 42, respectively. Similarly, valve door 26 includes first and second arms 44, 46 rotationally joined to OFV frame 22 at pivot couplings 48, 50, respectively. Further description of a unique "loose bearing" attachment interface that may be provided at any or all of pivot couplings 40, 42, 48, 50 is set-forth below in conjunction with FIGS. 10 and 11. A slave link 52 mechanically links arm 38 of valve door 24 to arm 46 of valve door 26. The combination of arms 38, 46 and slave link 52 form a linkage ensuring simultaneous rotation of valve doors 24, 26 between the closed and open positions. Movement of valve doors 24, 26 can be controlled in response to sensor input (e.g., cabin pressure measurements), in response to preset scheduling in relation to flight phase, in response to pilot control, or utilizing any combination thereof.

A side-mounted valve actuator 54 is secured to a thickened peripheral region of non-metallic OFV frame 22 referred to herein as "actuator support tower 34." A master linkage 55 (e.g., a bell crank linkage) mechanically links the output of valve actuator 54 to slave link 52, arm 38 of valve door 24, and arm 46 of valve door 26 to allow actuator 54 to control pivoting movement of doors 24, 26. Valve actuator 54 can assume any form suitable for moving valve doors 24, 26 through a range of angular positions, as described below. In the illustrated example, specifically, valve actuator 54 is realized utilizing twin electrical drive motors mounted to an upper principal surface (herein, an inboard support surface) of actuator support tower 34. Valve actuator 54 is usefully secured to the inboard support surface of actuator support tower 34 utilizing enhanced attachment features, such as specialized compression limiters, to avoid exerting excessive localized stress to tower region 34 when mounting valve actuator 54 thereto, and despite the relatively high weight or mass of actuator 54. Additional description of one useful manner in which valve actuator 54 may be secured to the support surface of actuator support tower 34 utilizing such compression limiters is further provided below in conjunction with FIGS. 7-9.

During operation of cabin OFV assembly 20, valve actuator 54 selectively moves cabin OFV assembly 22 between partially open (cruise) and closed positions by rotating valve doors 24, 26 about parallel rotational axes. As previously indicated, pressurized air flows from the A/C fuselage, through non-metallic OFV frame 22 and past valve doors 24, 26, and to the ambient environment when cabin OFV assembly 20 is moved into a fully open or partially open (cruise) position. Cabin OFV assembly 20 is usefully designed such that pressurized airflow through valve doors 24, 26 occurs in a relatively smooth and quiet manner. In addition, when leveraged for thrust recovery purposes, cabin OFV assembly 20 may be designed to encourage the rapid outflow of pressurized air to maximize thrust output. In this regard, a curved bellmouth feature 56 can be provided along the interior edge of valve door 24 to promote relatively smooth airflow through cabin OFV assembly 20 in the cruise position. Additionally or alternatively, a row of teeth 58, posts, or similar projections can be provided along the inner edge of valve door 26 to disrupt vortices for noise suppression purposes. In other instances, OFV assembly 20 may lack bellmouth feature 56, teeth 58, and various other features present in the illustrated example.

As emphasized above, OFV frame 22 is fabricated from one or more non-metallic materials, whether in its entirety or at least in principal part by volume. In many instances, non-metallic OFV frame 22 is entirely composed of a non-metallic material, noting that a metallic coating or shell may be formed over selected exterior surfaces of OFV frame 22 for lightning dissipation purposes, as described below. In embodiments, non-metallic OFV frame 22 is principally composed of an engineered thermoplastic, such as PEEK, which can be molded to form OFV frame 22 as a single part or monolithic piece. In such instances, the thermoplastic material may be filled or loaded with additives, such as carbon fibers, to produce composite materials having enhanced proprieties. In this regard, and by way of non-limiting example only, non-metallic OFV frame 22 can be produced from a molded thermoplastic (e.g., PEEK) in embodiments filled with 5% to 40% carbon fibers, by weight percentage; and, preferably, with 15% to 35% carbon fibers, by weight percentage. In alternative embodiments, non-metallic OFV frame 22 can be fabricated from another non-metallic material and may be produced in various other manners, including through the usage of an additive-manufacturing process, such as three-dimensional printing. Whether non-metallic OFV frame 22 is fabricated utilizing a molding process, an additive manufacturing process, or another manufacturing technique, machining may be performed as needed to refine dimensions or produce certain structural features of OFV frame 22. Generally, however, OFV frame 22 may be molded, additively manufactured, or otherwise produced to a near net shape such that additional post-production machining can be minimized, if not eliminated.

The material from which non-metallic OFV frame 22 is composed will typically be a dielectric such that OFV frame 22 is electrically non-conductive. Comparatively, valve doors 24, 26 may be composed of a metallic material, such as an aluminum- or titanium-based alloy, which is electrically conductive. Noting that valve doors 24, 26 are exposed from exterior of the A/C, there exists the possibility of lightning striking the valve doors 24, 26, particularly when rotated into a fully or partially open position during flight. If an adequate electrical conduction path is not provided between valve doors 24, 26, and the ground plane of the A/C (e.g., an expanded metal mesh embedded in the A/C fuselage) electrical arcing and potential damage to cabin OFV assembly 20, and possibly surrounding A/C components, can occur in the unlikely event of a lightning strike to doors 24, 26. For this reason, an electrically-conductive coating 60 may be applied to selected surfaces of OFV frame 22, coating 60 represented by dot stippling in FIG. 1. Grounding straps 62 may extend from attachment points 64 on valve doors 24, 26 to attachment points 66 on OFV frame 22, as shown. In this manner, a robust, electrically-conductive path is thus formed extending from valve doors 24, 26, through grounding straps 62, through electrically-conductive coating 60, through mounting hardware 28, and to the A/C ground plane for dissipating lightning energy should lightning strike valve doors 24, 26. Grounding straps 62 are sufficiently flexible so as to allow unhindered rotation or pivoting of valve doors 24, 26.

When present, electrically-conductive coating 60 is usefully applied to a limited portion of non-metallic OFV frame 22, such as the outer peripheral surfaces of OFV frame 22, as indicated in FIG. 1. In such instances, electrically-conductive coating 60 does not fully encapsulate non-metallic OFV frame 22, but rather leaves portions of OFV frame 22 exposed or uncovered by coating 60 to ensure that OFV frame 22 retains sufficient flexibility to accommodate A/C fuselage deformation. Electrically-conductive coating 60 may be a single layer coating or a multi-layer coating system. For example, in certain implementations, electrically-conductive coating 60 may include a first coating layer, which has a first electrical conductivity; and a second coating layer, which is formed over the first coating layer and has a second electrical conductivity less than the first electrical conductivity. In such implementations, and by way of non-limiting example, the first coating layer may be predominately composed of copper, by weight; while the second coating layer may be predominately composed of nickel and cobalt, again by weight. Further, in certain embodiments, electrically-conductive coating may also include an electroless nickel strike layer deposited directly onto non-metallic OFV frame 22, with one or more additional, electrically-conductive layers then formed over the electroless nickel strike layer.

Figure 3:
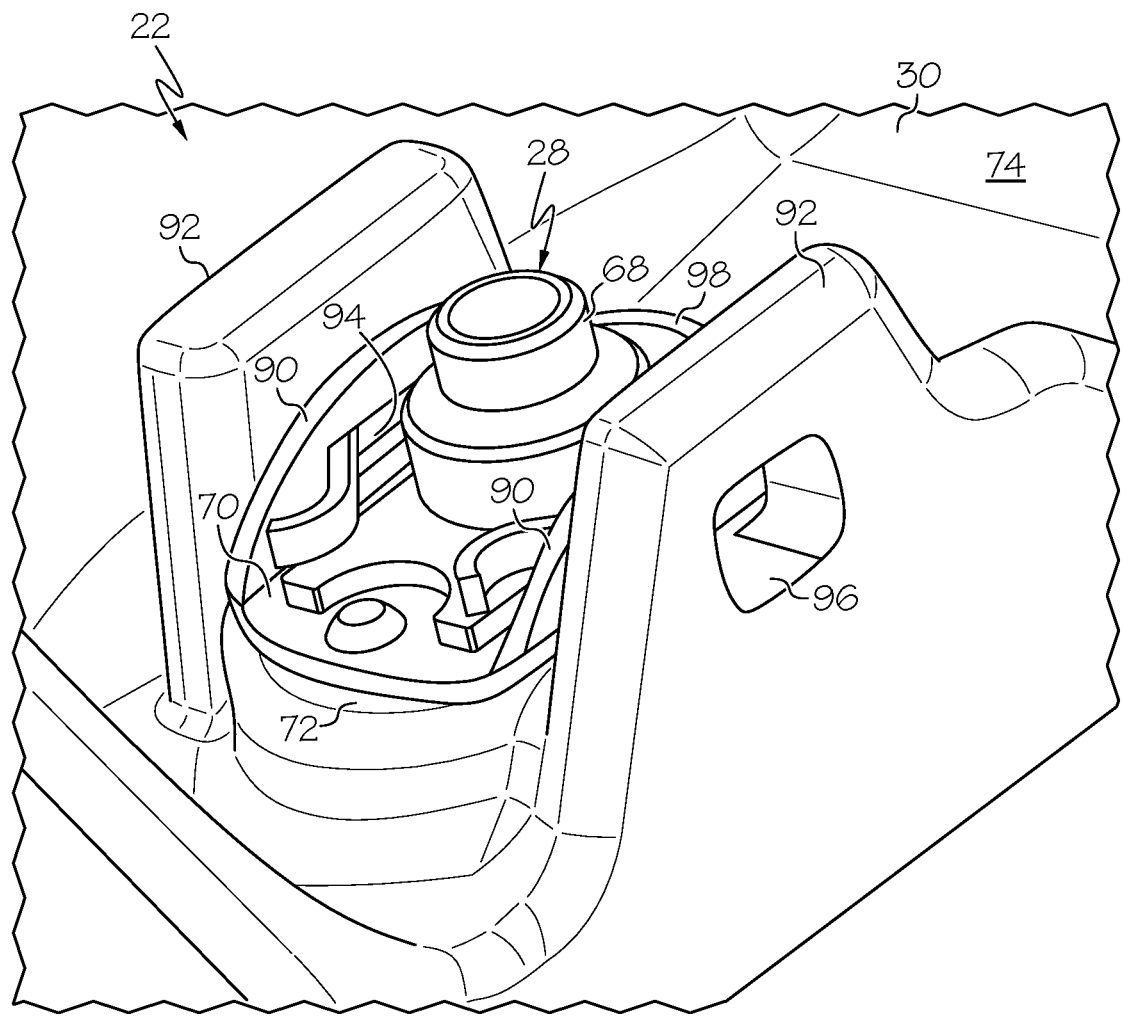
FIG. 3 is a detailed isometric view of an enhanced frame attachment feature and associated mounting hardware, several instances of which are spaced or distributed about the outer peripheral flange of the exemplary cabin OFV assembly shown in FIGS. 1 and 2.
Figure 4:
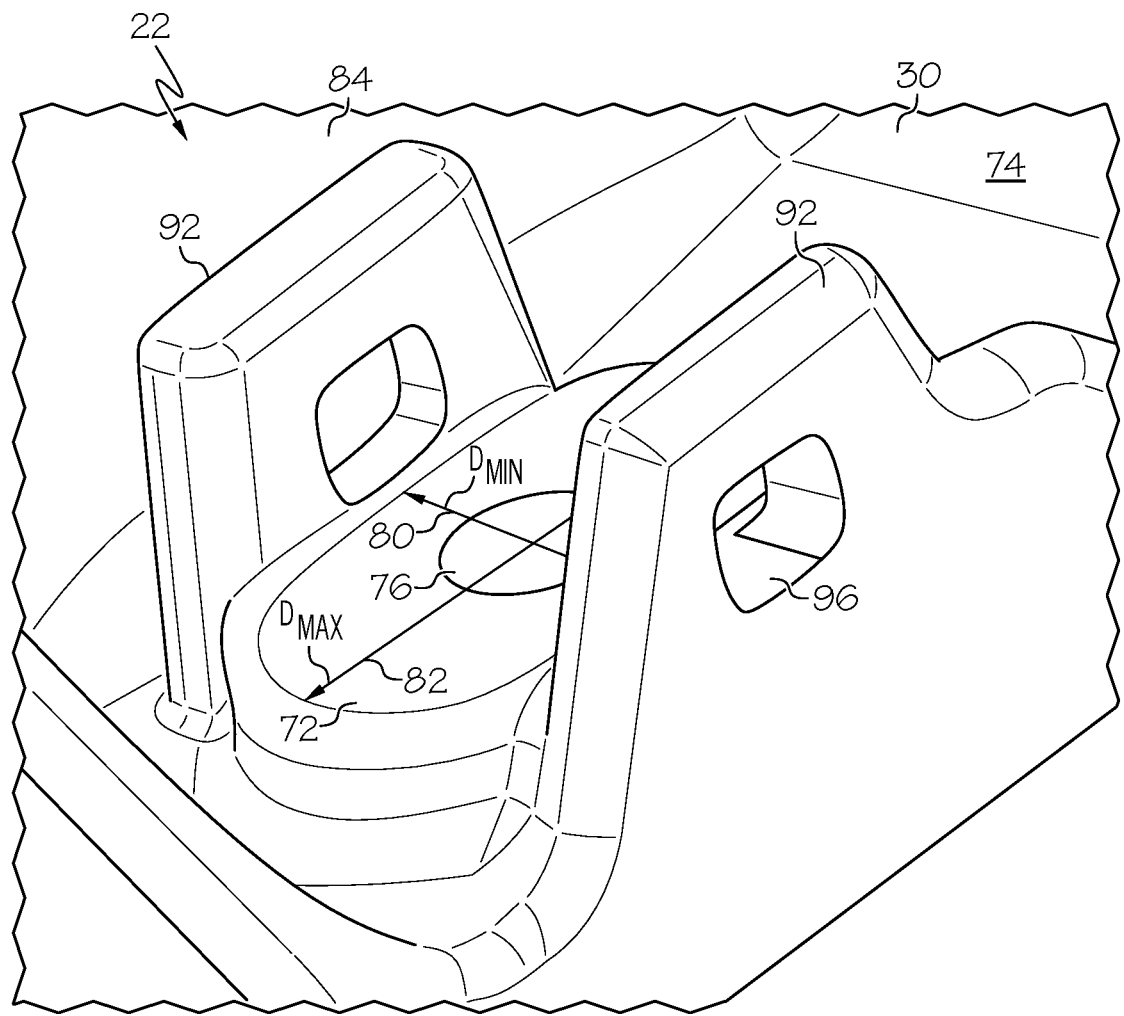
FIG. 4 is an isometric view of a frame attachment interface formed in an inboard side of the OFV frame and including an elevated, ovular platform region suitably included in the enhanced frame attachment feature shown in FIG. 3.
Figure 5:
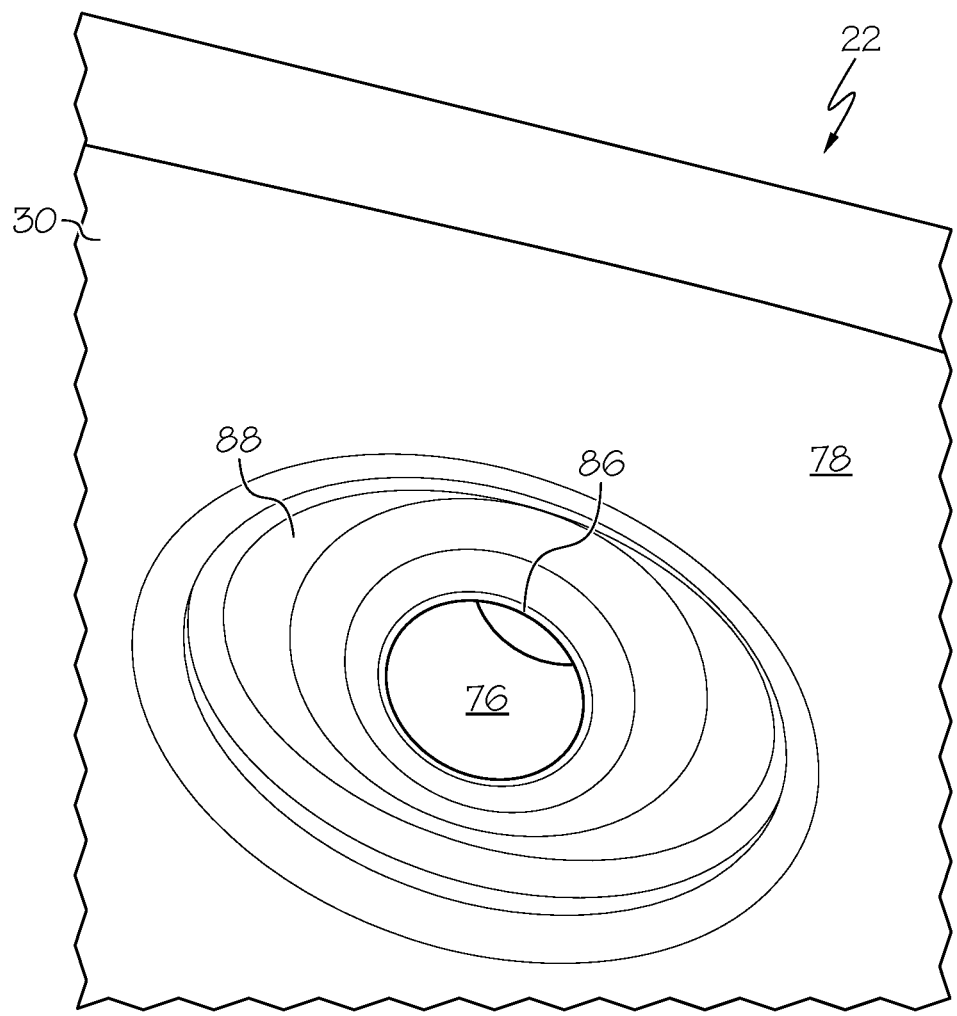
FIG. 5 is an isometric view of the frame attachment interface shown in FIG. 4, as seen from an outboard side of the OFV frame and revealing a raised rim recessed in a cavity further included in the enhanced frame attachment feature shown in FIG. 3.

With continued reference to FIGS. 1 and 2, and referring also now to FIGS. 3-5, mounting hardware 28 is utilized to secure cabin OFV assembly 20 to an A/C fuselage. Mounting hardware 28, along with certain structural or topological features of OFV frame 22, form a first type of enhanced attachment feature, interface, or mechanism referred to herein as "enhanced frame attachment feature." Such enhanced frame attachment features may be spaced about outer peripheral flange 30 of non-metallic OFV frame 22 and utilized to affix OFV frame 22 to an A/C fuselage when cabin OFV assembly 20 is installed onboard an A/C. An example of one such enhance attachment feature is shown in FIGS. 3-5. As identified in FIG. 3, mounting hardware 28 includes a fastener 68, such as a bolt and nut; and a nut or base plate 70, which is engaged by the head fastener 68. Base plate 70 is positioned over and may seat against a raised topological feature or elevated platform region 72 formed on inboard side 74 of peripheral flange 30; the term "inboard side," as appearing herein, denoting the principal surface of peripheral flange 30 facing the interior of the A/C when cabin OFV assembly 20 is installed on an A/C. The opposing side or face of peripheral flange 30 is referred to herein as the "outboard side" of flange 30 (that is, the side of flange 30 facing the ambient environment when OFV assembly 20 is installed on an A/C) and is identified in FIG. 5 by reference numeral 78. In certain cases, base plate 70 may be adhesively bonded to elevated platform region 72 utilizing, for example, a bonding material similar or identical to that described below in connection with FIG. 11. Base plate 70 is still considered to seat against or abut elevated platform region 72 when an intervening bonding layer is utilized to join plate 70 and platform region 72. It will be appreciated that the bonding layer, when included, is sufficiently thin or electrically conductive enough to allow for conduction/dissipation of energy from a lightning strike to the doors into the plate 70 and out through the fastener 68.

To permit passage of the elongated body of fastener 68 through flange 30, a fastener opening 76 is provided through outer peripheral flange 30 and, specifically, extends from a central portion of platform region 72 to the opposing side or face of peripheral flange 30. As shown most clearly in FIG. 4, elevated platform region 72 may be imparted with an elongated geometry, such as a rectangular or ovular geometry. Thus, in such instances, elevated platform region 72 may be dimensioned to include: (i) a maximum dimension (e.g., a major diameter) $D_{MAX}$ taken along a first axis, as identified in FIG. 4 by double headed arrow 80, and (ii) a minimum dimension (e.g., a minimum diameter) $D_{MIN}$ taken along a second axis perpendicular to the first axis, as identified by double headed arrow 82. Additionally, in at least some instances, elevated platform region 72 may be oriented such that its maximum dimension ($D_{MAX}$) extends substantially parallel to a neighboring or adjacent section of the inner peripheral rim or wall 84 of non-metallic OFV frame 22, which extends around the outer peripheral of the central opening through OFV frame 22. The particular shape and dimension of elevated platform regions 72 will vary among embodiments; however, by way of non-limiting example, platform regions 72 may have ovular geometries (shown) dimensioned such that $D_{MAX}$ is at least 25% greater than $D_{MIN}$.

As noted above and shown in FIG. 3, base plate 70 seats upon platform region 72 and may cover platform region 72, at least in substantial part, when OFV frame 22 is attached to an A/C fuselage. Due to the provision of base plate 70, and the dimensioning of base plate 70 and platform region 72, a leverage mechanism is created that accommodates and is reactive to deformation of the A/C fuselage, while further enabling a secure mechanical connection to be maintained between OFV frame 22 and the A/C fuselage through mounting hardware 28. Specifically, in this regard, and depending upon the manner in which the A/C fuselage distorts or deflects, base plate 70 may function as a cantilevered beam or lever, which has a fulcrum at a pinch point between base plate 70 and platform region 72, to exert an increased force urging non-metallic OFV frame 22 against the A/C fuselage and return of frame 22 to its non-deflected state. In this manner, mounting hardware 28 combine with elevated platform regions 72 to form enhanced frame attachment features enabling non-metallic OFV frame 22 to accommodate deflection of the A/C fuselage, particularly along the z-axis parallel with the centerline of OFV frame 22.

In addition to elevated platform regions 72, the enhanced frame attachment features of cabin OFV assembly 20 may be produced to include strategically-positioned resilient members or projections, which enable OFV frame 22 to tolerate higher fastener preload exerted by fasteners 68 when installed through fastener openings 76 (FIGS. 4 and 5) and tightened against the A/C fuselage. An example of one such resilient member, provided in the form of an axially-projecting feature or raised rim 86, is shown in FIG. 5. As can be seen in this figure, raised rim 86 is recessed in a depression or small cavity 88 formed in face 78 of outer peripheral flange 88. Raised rim 86 is formed around and circumscribes fastener opening 76; e.g., rim 86, fastener opening 76, and cavity 88 may be substantially concentric. Each raised rim 86 is located opposite a corresponding elevated platform region 72, as taken along an axis parallel to the centerline of non-metallic OFV flange 22 and, more generally, cabin OFV assembly 20. Rim 86 projects from the floor of cavity 88 in an axial direction; that is, along an axis substantially parallel with the centerline of fastener opening 76. Thus, generally considered, raised rim 86 resembles the iris of an eye, with fastener opening 76 resembling the pupil and cavity or depression 88 resembling the outline or edges of the eye. In embodiments, raised rim 86 may be integrally formed with the remainder of OFV frame 22 as, for example, as a molded or additively-produced feature.

When mounting hardware 28 is utilized to secure non-metallic OFV frame 22 to the A/C fuselage, a part or component of hardware 28 (e.g., a nut threaded onto a bolt) may be received in cavity 88 and tightened against rim 86. Due to its shape and the inherent resiliency of the material from which non-metallic OFV frame 22 is produced, raised rim 86 is able to undergo limited compression to accommodate a greater fastener preload, while distributing material stress relatively uniformly around the fastener opening 76 and the floor of cavity 88. In essence, then, raised rim 86 (or a similar projecting feature) serves as a resilient spring member or feature better accommodating higher fastener preloads to allow non-metallic OFV frame 22 to be firmly secured to the A/C fuselage utilizing mounting hardware 28. Concurrently, the provision of raised rim 86 may reduce the likelihood of overstressing and potentially cracking or otherwise damaging the portions of OFV frame 22 surrounding fastener openings 76. Similarly, raised rim 86 may decrease the rate of material fatigue in these regions in the presence of dynamic loading; e.g., as non-metallic OFV frame 22 flexes with deflection of the A/C fuselage. Generally, then, raised rim 86 (also referred to as a "molded eye feature" of OFV frame 22 when produced by molding) addresses static clamp-up loading issues, as well as dynamic loads occurring during service.

It may be desirable to remove cabin OFV assembly 20, after installation, from the exterior of the A/C for maintenance or inspection purposes. In embodiments, cabin OFV assembly 20 may be removable by turning the nuts located in recesses 88 relative to the bolts included in mounting hardware 28 (shown in FIGS. 1-3). If the bolts and base plates 70 are permitted to freely turn with the nuts, blind or one-sided removal of cabin OFV assembly 20 from the exterior of the A/C may be rendered difficult or impractical. For at least this reason, one or more anti-rotation features may be further integrated into the enhanced frame attachment interface shown in FIGS. 3-5. For example, and referring again to FIG. 3, the illustrated base plate 70 may be provided with wings 90, which project upwardly from opposing edges of the main body of plate 70. Similarly, raised projections or (e.g., molded) rails 92 may be integrally formed with peripheral flange 30 and project upwardly from inboard face 74 of flange 30 on opposing sides of platform region 72. Wings 90 may thus contact rails 92 to arrest free rotation of base plate 70 and fastener 68, as appropriate, to serve as an anti-rotation feature permitting blind removal of cabin OFV assembly 20 from the exterior of the A/C.

With continued reference to FIG. 3, side apertures or openings 94, 96 may be further provided through wings 90 of base plate 70 and rails 92 projecting upwardly from flange 30, respectively, as shown. A C-shaped spring clip 98 may be disposed around the inboard terminal end of fastener 68, adjacent base plate 70, and engage into side openings 94, 96. C-shaped spring clip 98 consequently retains base plate 90 and, perhaps, fastener 68 in its desired position until the legs of spring clip 98 are squeezed together or otherwise depressed to allow disengagement from side openings 94, 96. In so doing, spring clip 98 provides redundant mechanical retention of these components. In further embodiments, a different type of redundant retention mechanism and/or a different type of anti-rotation mechanism may be integrated into the enhanced frame attachment feature; or the enhanced frame attachment feature may lack such mechanisms.

Figure 6:
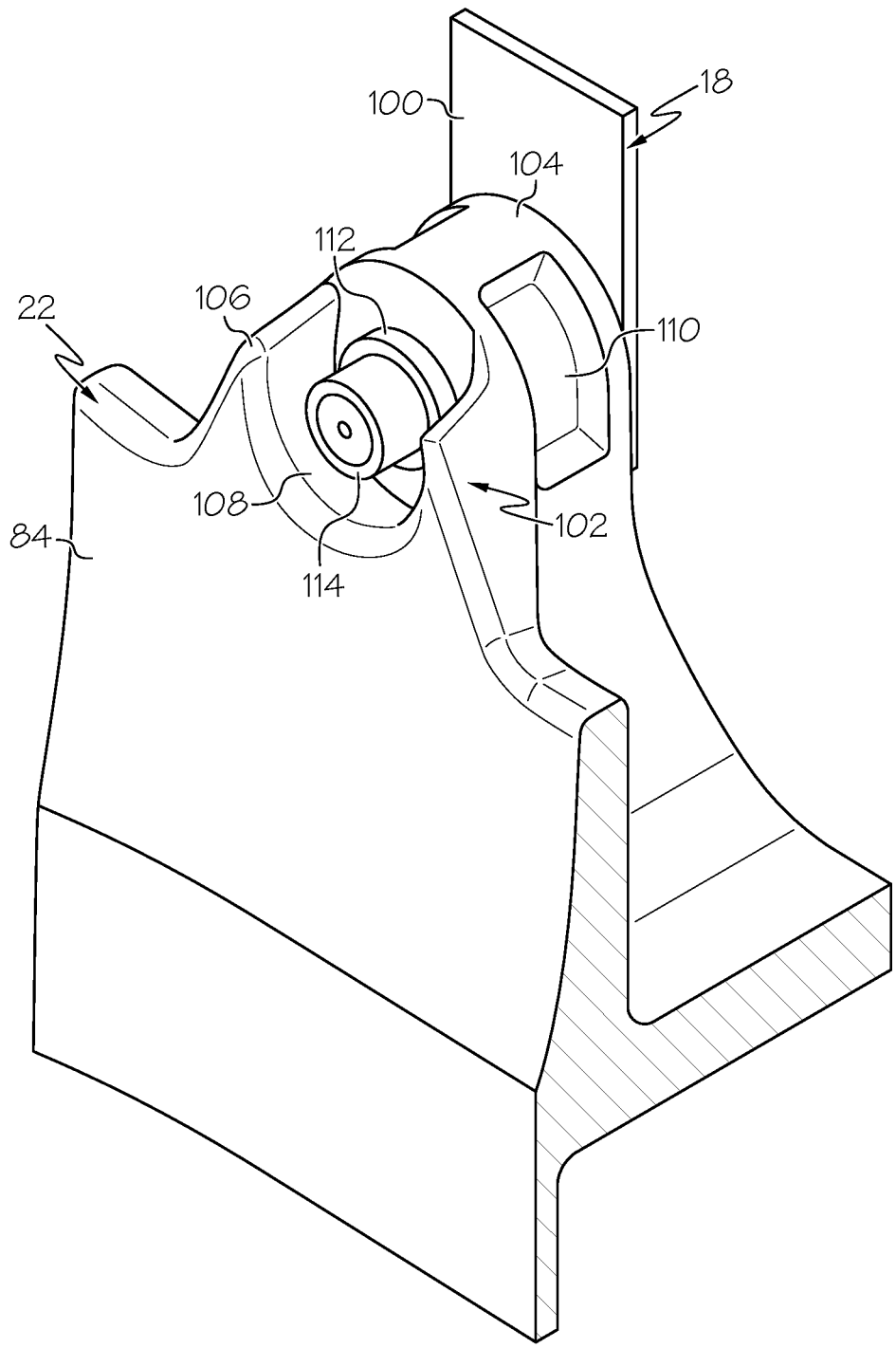
FIG. 6 is a cutaway isometric view of portions of the non-metallic OFV frame and cage shown in FIGS. 1 and 2, which illustrates an enhanced cage attachment feature depicted in accordance with an exemplary embodiment of the present disclosure.

As previously discussed, a cage 18 may be attached to non-metallic OFV frame 22 in at least some embodiments of cabin OFV assembly 20. When so attached, cage 18 may be joined to OFV frame 22 through enhanced cage attachment features. An example of one such enhanced cage attachment feature is shown in FIG. 6. Here, a portion of a post 100 included in cage 18 is affixed to inner peripheral wall 84 of non-metallic OFV frame 22 via attachment interface 102. Attachment interface 102 includes a thickened boss 104 having a shouldered head 106 including a generally cylindrical recess 108 and strengthening depressions 110 formed around boss 104. A metallic (e.g., brass) sleeve, insert, or lug 112 is press-fit or otherwise inserted into an opening provided through boss 104, which further receives a fastener 114 utilized to attach cage 18 to boss 104 and, more generally, to non-metallic OFV frame 22. Due to the thickened dimensions of boss 104, material stress imparted through fastener 114 is distributed in a more uniform manner over a greater volume of material to minimize local stress concentrations and reduce material fatigue. Concurrently, metallic insert, sleeve, or lug 112 better preserves the fastener preload exerted across boss 104 and post 100 of cage 18, which may otherwise decrease (thus risking the possibility of fastener detachment) as the non-metallic material of OFV frame 22 creeps or otherwise deforms over time with temperature exposure.

Figure 7:
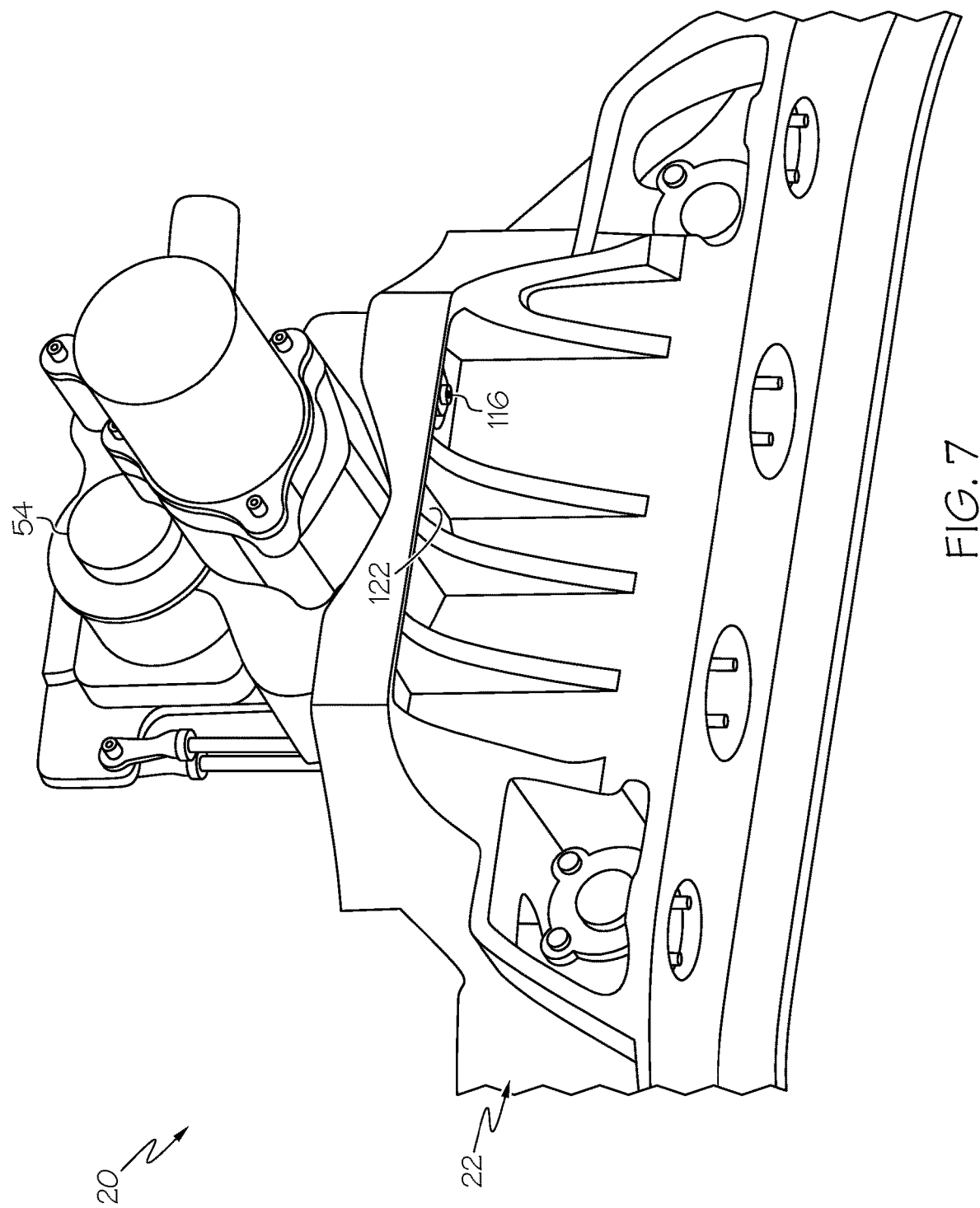
FIG. 7 is a side isometric view of the cabin OFV assembly shown in FIGS. 1 and 2 illustrating the underside actuator support tower included in the non-metallic OFV frame to support the valve actuator, which may be attached to the tower region utilizing compression limiters and other specialized mounting hardware.
Figure 8:
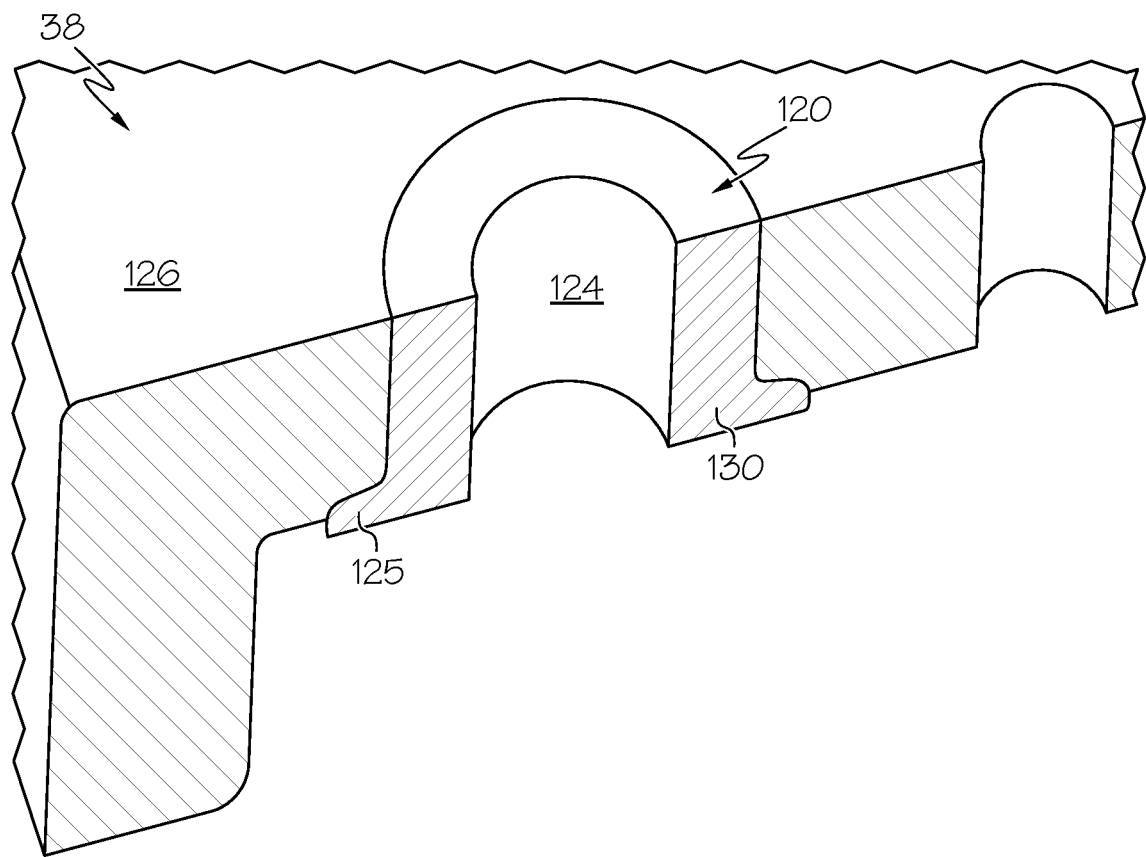
FIGS. 8 and 9 are cross-sectional views of a compression limiter utilized to attach the valve actuator to the actuator support tower of the OFV frame shown in FIG. 7 and forming part of an enhanced valve actuator attachment feature.
Figure 9:
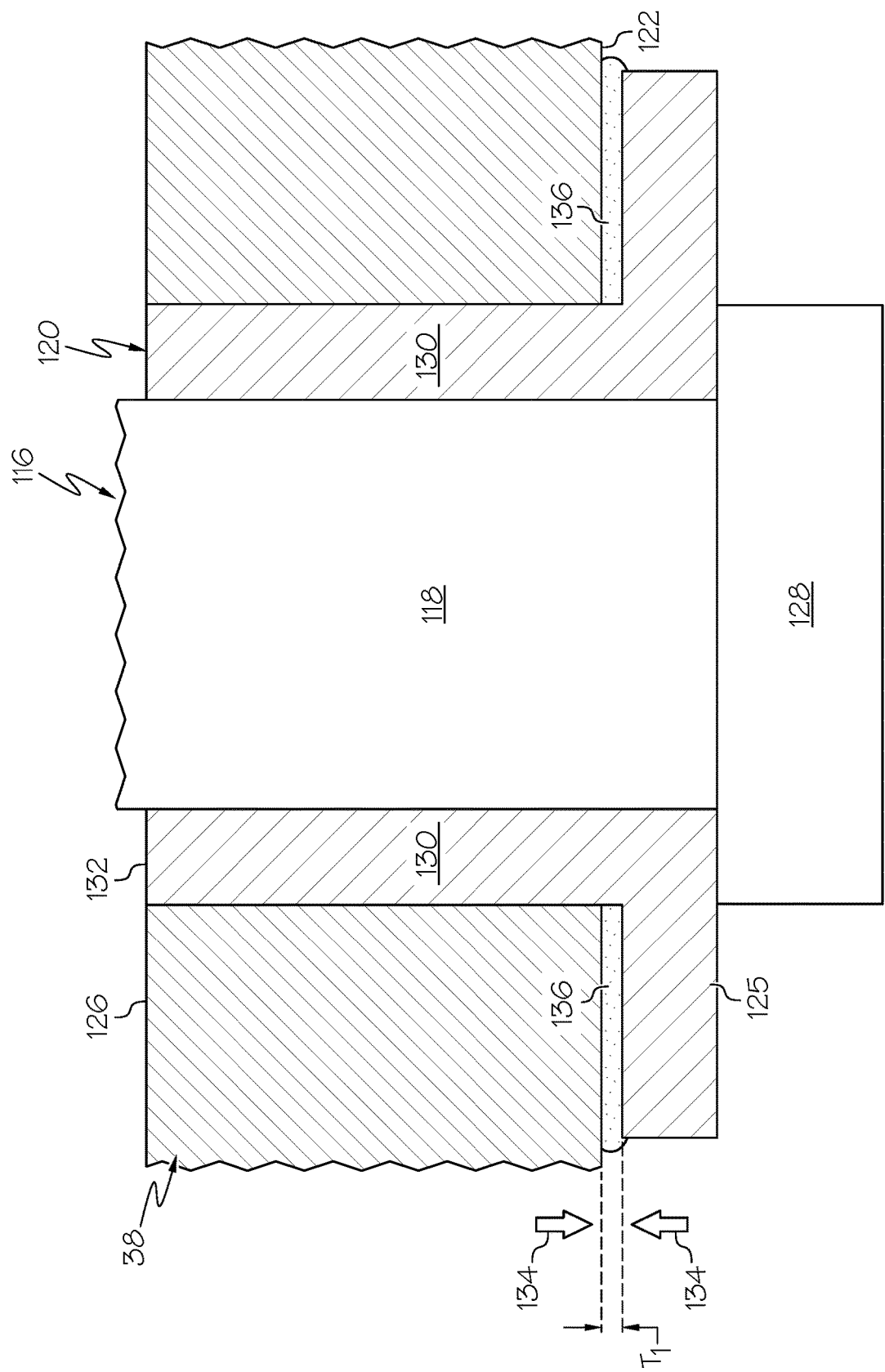

Embodiments of cabin OFV assembly 20 may include a still further type of enhanced attachment feature, interface, or mechanism in addition to or in lieu of the various other types of enhanced attachment interfaces discussed above. This additional type of enhanced attachment interface (herein, a "mount tower attachment interface 116") is shown in FIGS. 7-9 and is utilized to attach valve actuator 54 to actuator support tower 34. Referring collectively to FIGS. 7-9, mount tower attachment interfaces 116 each include a fastener 118 (FIG. 9) and a generally tubular compression limiter 120 (FIGS. 8 and 9), which are installed through underside 122 of tower region 34 (FIG. 7). Specifically, fastener 118 extends through a central channel 124 (FIG. 8) provided through compression limiter 120 to engage mating openings in valve actuator 54 and thereby secure actuator 54 against an upper principal or inboard support surface 126 (FIGS. 8 and 9) of actuator support tower 34. Terminal flange 125 of compression limiter 120 engages a portion of fastener 118 (e.g., fastener head 128 shown in FIG. 9) to help distribute the fastener preload across flange 125 and tubular body 130 of limiter 120. As a result, a greater fastener preload can be exerted by fastener 118 across compression limiter 120 to secure valve actuator 54 against upper support surface 126 of actuator support tower 34 without exerting excessive localized stress into the non-metallic OFV flange material.

It is desirable to present an essentially flat or co-planar support surface to facilitate mounting of valve actuator 54 flush against actuator support tower 34. The terminal end surface 132 of compression limiter 120 (FIG. 9) is thus desirable placed in a substantially coplanar or "line-to-line relationship" with upper support surface 126 of actuator support tower 34. A technical challenge arises, however, as manufacturing tolerances and stack-up render it difficult, if not impractical to ensure such a coplanar relationship between surfaces 126, 132 without significant cost increase. In one approach, this technical challenge is overcome by providing a relatively small axial clearance, stand-off, or gap (represented in FIG. 9 by arrows 134) between lower surface 122 of actuator support tower 34 and the underside of peripheral flange 125 of compression limiter 120. To this end, tubular body 130 of compression limiter 120 may be imparted with a length slightly exceeding the length of the opening formed in actuator support tower 34 such that, absent gap 134, the terminal end of tubular body 130 would project upwardly beyond upper support surface 126. During installation, a layer of a bonding material 136 is introduced into gap 134 to fill gap 134, while setting the axial height thereof; that is, the height of gap 134 taken along an axis parallel to the centerline or longitudinal axis of fastener 118 and compression limiter 120. A sufficient volume of bonding material 136 may be applied to fill gap 134 in its entirety or at least in substantial part. In certain instances, gap fill material 136 may develop cracks over time; however, despite this, bonding material 136 will generally remain within gap 134 to ensure the appropriate spacing between flange 125 and lower surface 122 of actuator support tower 34. Upper terminal surface 132 of compression limiter 120 and upper support surface 126 of actuator support tower 34 are thus maintained in the desired coplanar relationship.

Figure 10:
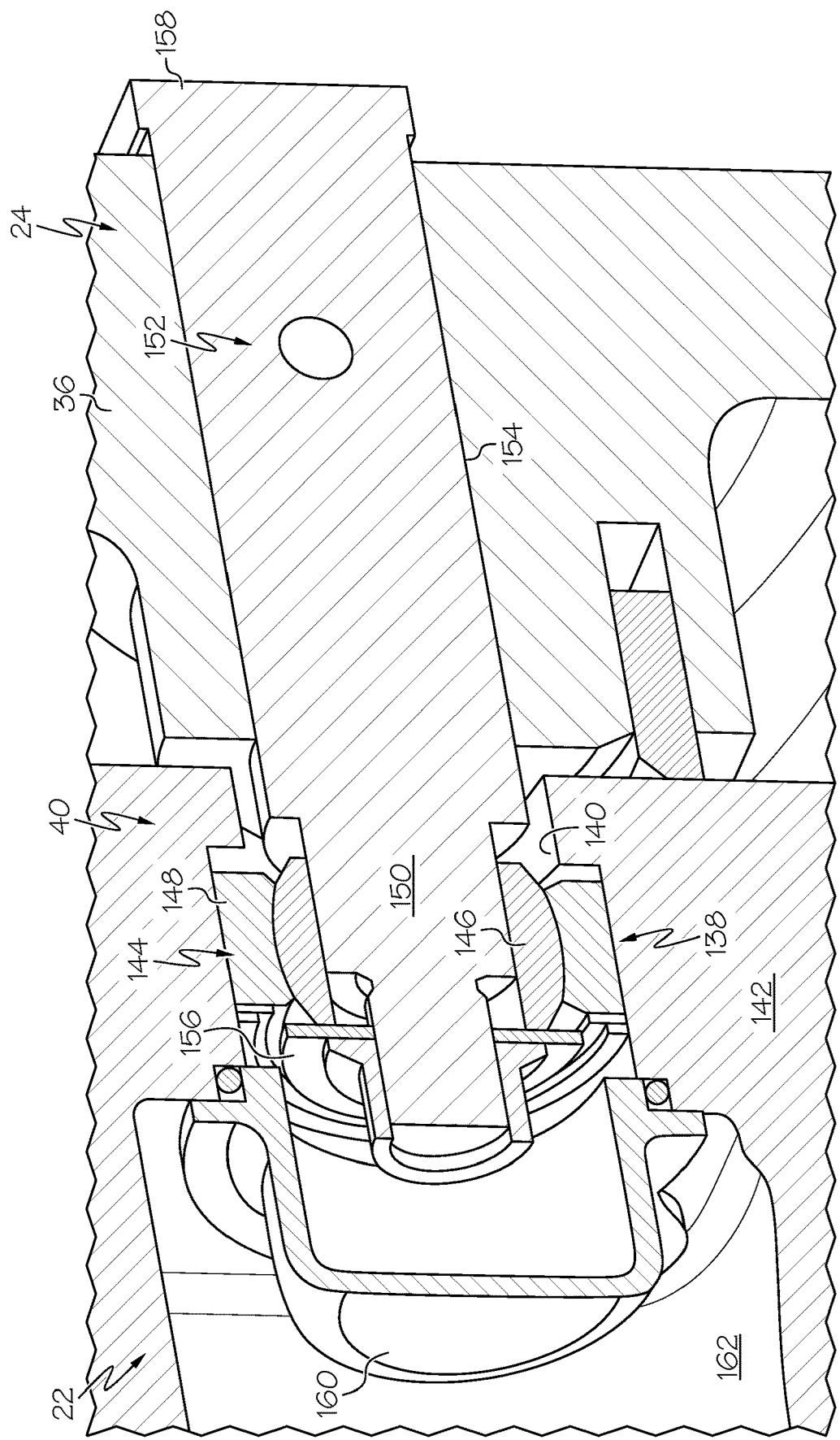
FIG. 10 is a cross-sectional isometric view of a portion of a loose fit bearing interface, which may be provided between the non-metallic OFV frame and a valve door included in the OFV assembly shown in FIGS. 1 and 2 and which forms a further enhanced attachment feature or interface.
Figure 11:
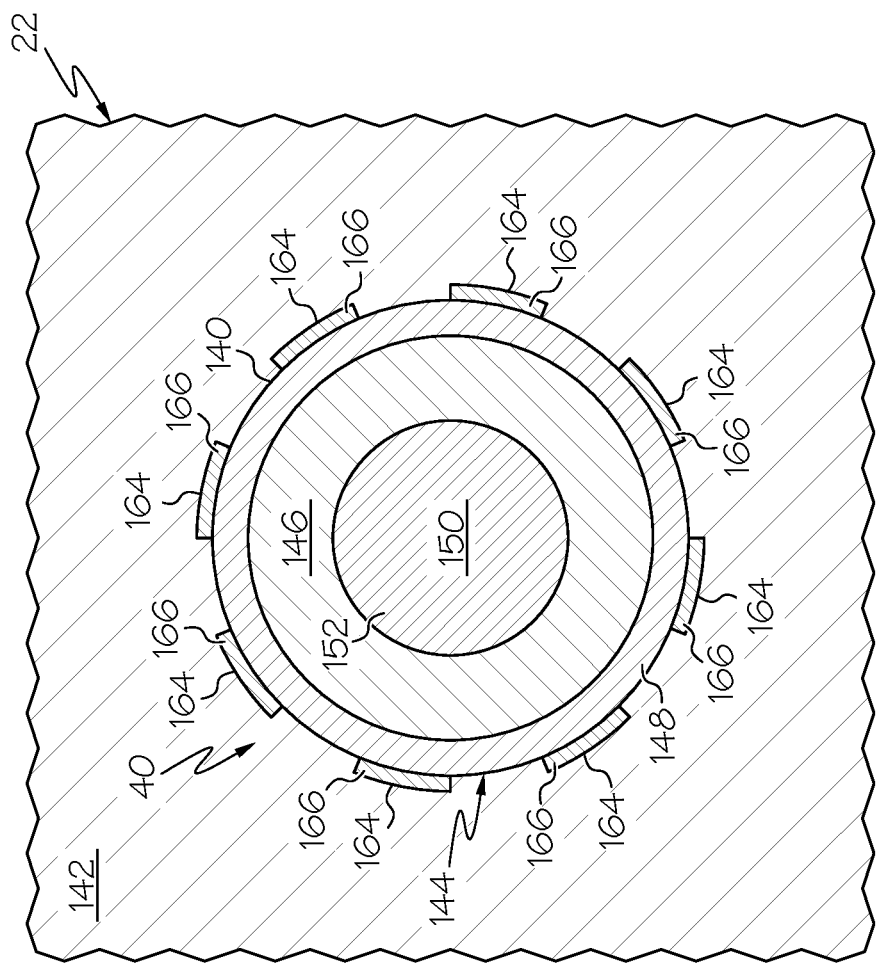
FIG. 11 is a cross-sectional view through the loose fit bearing interface shown in FIG. 10, as taken along a section plane orthogonal to the rotational axis of the bearing and schematically depicting hoop stress-relieving castellations or notches usefully formed around an interior periphery of a bearing-receiving opening in the non-metallic OFV frame in embodiments.

A still further enhanced attachment interface usefully included in embodiments of cabin OFV assembly 20 is a so-called "loose fit" bearing interface. An example of such a loose fit bearing interface 138 is shown in FIGS. 10 and 11. Referring to these drawing figures in conjunction with FIG. 1, loose fit bearing interface 138 is depicted as being provided at pivot coupling 40 and will thus be described as such herein below. This notwithstanding, loose fit bearing interfaces similar or identical to bearing interface 138 can be provided at any or all of pivot couplings 42, 48, 50, with the following description equally applicable thereto. A cylindrical cavity 140 is provided in region 142 of OFV frame 22 and houses an annular (e.g., rolling element) bearing 144. In the illustrated example, annular bearing 144 assumes the form of a uniball bearing having an inner rolling element 146 surrounded by an outer ring 148. In other embodiments, a different type of bearing may be utilized in place of annular bearing 144, such as a ball bearing or other rolling element bearing. Inner rolling element 146 of annular bearing 144 pilots to a terminal end 150 of an elongated pin 152, the opposing end of which is received through a bore 154 provided through arm 36 of valve door 24. A nut 156 is further threaded onto terminal end 150 of pin 152 and abuts inner rolling element 146 of annular bearing 144 to retain pin 152 in its desired position, noting that opposing end 158 of pin 152 has an enlarged outer diameter to prevent entry into bore 154. Finally, a cap 160 is positioned in a larger recess 162 to cover nut 156 and annular bearing 144, generally, to reduce bearing contamination.

Annular bearing 144 is received within cavity 140 in a close fitting, mating relationship. Specifically, annular bearing 144 may be inserted into cavity 140 with a light or loose press-fit such that relatively little hoop stress is exerted on the interior portion of OFV frame 22 defining cavity 140. This prevents the application of excessive hoop stress on the surrounding non-metallic material of OFV frame 22, which could otherwise crack or damage the frame material if exposed to high hoop stresses conventionally encountered when press fitting metal bearings into metallic OFV frames. Further, if desired, the inner periphery of cavity 140 may be imparted with circumferential recesses, notches, or castellations 164, which are spaced about the rotational axis of annular bearing 144 and pin 152, as illustrated in FIG. 11, to further disrupt or break-up hoop stress. As indicated in FIG. 11 by dot stippling, the void spaces formed by recesses or castellations 164 (if present) and any annular gap provided between outer ring 148 of annular bearing 144 and the interior surface of cavity 140 may be filled with a suitable bonding material 166. Bonding material 166 is usefully formulated to form a relatively robust bond with both the metallic material of outer ring 148 of annular bearing 144 and the surrounding non-metallic material (e.g., PEEK or other thermoplastic) of OFV frame 22. In this regard, bonding material 166 is ideally formulated to have a relatively high sheer strength. Additionally, bonding material 166 should be selected to withstand exposure to fluids and other contaminants to which cabin OFV assembly 20 may be exposed during usage. In one embodiment, bonding material 166 comprises a high temperature acrylic-containing adhesive.

By way of non-limiting example, loose fit bearing interface 138 can be produced utilizing the following process during assembly of cabin OFV assembly 20. First, the inner periphery of cavity 140 may be intentionally roughed (e.g., utilizing grit paper) and then cleaned by applying an appropriate solvent. Afterwards, a liquid primer may be applied to activate and increase the propensity of the surface of the non-metallic material of OFV frame 22 to form a strong bond with the selected adhesive. In one embodiment, the selected primer is a cyanoacrylate-based primer, which is applied in a wet state by brushing. Afterwards, a bonding material precursor is further applied in a wet state to the inner periphery of cavity 140, to the outer circumference of annular bearing 144, or to a combination thereof. The bonding material precursor may contain a selected adhesive agent, such as acrylic, dispersed in a liquid (e.g., aqueous or non-aqueous) carrier. Annular bearing 144 may then be press-fit into cavity 140, and the bonding material precursor may be allowed to dry or otherwise cured to yield bonding material 166 shown in FIG. 11.

Conclusion

The foregoing has thus provided OFV assemblies including non-metallic OFV frames having enhanced attachment features. In various embodiments, the non-metallic OFV frame may be composed of molded PEEK or another thermoplastic, which may or may not contain fillers (e.g., carbon fibers), in certain implementations. Various enhanced attachment features can be included in embodiments of the non-metallic OFV frame including features for joining the OFV frame to the A/C fuselage, features for joining a cage to the OFV frame, features for mounting the actuator to the OFV frame, and/or features for rotatably mounting the valve doors to the frame through a loose fit bearing joint. With respect to the features for mounting the non-metallic OFV frame to the A/C fuselage, in particular, a peripheral flange of the OFV frame can be molded or otherwise produced to include platform regions, which project from an inboard side of the flange. Base plates may seat against (and are possibly bonded to) the platform regions, and a first plurality of fasteners extending from the base plates through the first plurality of fastener openings to affix the outflow valve to the fuselage. Collectively, the base plates, fasteners, and elevated platforms form a leverage mechanism to allow the non-metallic frame to deflect with and react A/C fuselage deflections. Additionally, in certain embodiments, recesses containing fastener-abutting projections, such as raised rims, may be provided in the outboard side of the flange opposite the elevated platforms to enable and distribute higher fastener preloads across the non-metallic material of the OFV frame.

Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. The terms "first," "second," and the like are utilized herein to denote order of introduction during the course of description and may thus vary from the foregoing Detailed Description to the appended Claims to reflect changes in order of introduction.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. An outflow valve assembly for installation on an aircraft having a fuselage, the outflow valve comprising:
   a valve door; and
   a non-metallic frame to which the valve door is pivotally mounted, the non-metallic frame comprising:
      a frame body surrounding a central opening;
      an outer peripheral flange extending around at least a portion of the frame body, having an inboard side, and having an outboard side;
      elevated platform regions projecting from the inboard side of the outer peripheral flange in a direction opposite the outboard side of the outer peripheral flange;
      a first plurality of fastener openings formed through the elevated platform regions;
      base plates positioned over the elevated platform regions;
      anti-rotation features engaging the base plates to impede rotation of the base plates relative to the frame body; and
      a first plurality of fasteners extending from the base plates through the first plurality of fastener openings to affix the outflow valve to the fuselage when the outflow valve assembly is installed on the aircraft.

2. The outflow valve assembly of claim 1 wherein the elevated platform regions have substantially ovular planform geometries.

3. The outflow valve assembly of claim 1 wherein the elevated platform regions each comprise a planform geometry having a major dimension along a first axis and a minor dimension along a second axis perpendicular to the first axis, the major dimension greater than the minor dimension.

4. The outflow valve assembly of claim 1 wherein the non-metallic frame further comprises:
   recesses formed in the outboard side of the outer peripheral flange; and
   raised features within the recesses and engaging the first plurality of fasteners to exert a preload thereon when the outflow valve is installed on the aircraft.

5. The outflow valve assembly of claim 4 wherein the raised features comprise raised rims circumscribing the first plurality of fastener openings.

6. The outflow valve assembly of claim 4 wherein the raised features are formed opposite the elevated platform regions, as taken along axes parallel to a centerline of the non-metallic frame.

7. The outflow valve assembly of claim 1 wherein at least the outer peripheral flange, the frame body, and the elevated platform regions are integrally formed as a single molded piece.

8. The outflow valve assembly of claim 1 wherein the base plates each comprise:
   a main body seated on the elevated platform regions; and
   base plate wings projecting from the main body in a direction opposite the elevated platform regions; and
   wherein the anti-rotation features comprise rails projecting from the outer peripheral flange in inboard directions and abutting the base plate wings.

9. The outflow valve assembly of claim 1 wherein the valve door is pivotally coupled to the non-metallic frame at a first pivot joint, the first pivot joint comprising:

a boss integrally formed with the frame body and having an inner peripheral surface defining a generally cylindrical cavity;

an annular bearing disposed in the generally cylindrical cavity and contacting the inner peripheral surface; and a pin coupling the valve door to the annular bearing.

10. The outflow valve assembly of claim 9 wherein the inner peripheral surface defines an annular array of castellations; and wherein the first pivot joint further comprises a bonding material at least partially filling void space between adjacent castellations in the annular array of castellations.

11. The outflow valve assembly of claim 1 further comprising:

lug attachment openings distributed around the frame body;

metallic inserts inserted into the lug attachment openings; and a cage mounted to the non-metallic frame through the lug attachment openings and metallic inserts.

12. The outflow valve assembly of claim 1 wherein the non-metallic frame further comprises an actuator support tower having a second plurality of fastener openings in which compression limiter inserts are inserted; and wherein the outflow valve assembly further comprises:

a valve actuator seated on an inboard support surface of the actuator support tower and mechanically linked to the valve door; and a second plurality of fasteners extending through the second plurality of fastener openings to secure the actuator to the actuator support tower.

13. The outflow valve assembly of claim 12 wherein the compression limiters each comprise:

a tubular body having an inboard end portion and an outboard end portion; and a circumferential flange projecting radially outward from the tubular body adjacent the outboard end portion;

wherein the circumferential flange is spaced from an outboard surface of the actuator support tower by an axial gap; and wherein the axial gap is dimensioned such that the inboard end portion of the tubular body is substantially coplanar with the inboard support surface of the actuator support tower.

14. The outflow valve assembly of claim 13 further comprising a bond material filling at least a volumetric majority of the axial gap.

15. An outflow valve assembly, comprising:

a valve door; and an outflow valve frame to which the valve door is pivotally mounted, the outflow valve frame comprising:

a frame body surrounding a central opening;

an outer peripheral flange extending around at least a portion of the frame body;

fastener openings formed through the outer peripheral flange;

recesses formed in an outboard side of the outer peripheral flange; and raised rims within the recesses and circumscribing the first plurality of fastener openings;

wherein the frame body, the outer peripheral flange, and the raised rims are integrally formed as a single piece from a non-metallic material.

16. The outflow valve assembly of claim 15 further comprising elevated platform regions formed in an inboard side of the outer peripheral flange at locations opposite the raised rims, as taken along axes parallel to a centerline of the outflow valve frame.

17. A non-metallic outflow valve frame utilized within an outflow valve assembly deployed onboard an aircraft, the non-metallic outflow valve frame comprising:

a frame body surrounding a central opening;

an outer peripheral flange extending around at least a portion of the frame body, having an inboard side, and having an outboard side;

elevated platform regions projecting from the inboard side of the outer peripheral flange in a direction opposite the outboard side of the outer peripheral flange;

a first plurality of fastener openings formed through the elevated platform regions;

recesses formed in the outboard side of the outer peripheral flange;

raised rims within the recesses and circumscribing the first plurality of fastener openings;

base plates positioned over the elevated platform regions; and a first plurality of fasteners extending from the base plates through the first plurality of fastener openings to affix the outflow valve frame to a fuselage of the aircraft.

18. The non-metallic outflow valve frame of claim 17 wherein at least the outer peripheral flange, the frame body, and the elevated platform regions are integrally formed as a single molded piece.

* * * * *